(12) United States Patent
Liu (10) Patent No.: US 8,267,293 B2
(45) Date of Patent: Sep. 18, 2012

(54) CAR TOP BICYCLE FRAME FOR RETAINING AT LEAST ONE BICYCLE TRANSVERSALLY AND OBLIQUELY

(76) Inventor: Yung-Lin Liu, Taipei (TW)

( * ) Notice: Subject to any disclaimer, the term of this patent is extended or adjusted under 35 U.S.C. 154(b) by 531 days.

(21) Appl. No.: 12/489,410

(22) Filed: Jun. 22, 2009

(65) Prior Publication Data

US 2010/0038389 A1    Feb. 18, 2010

(30) Foreign Application Priority Data

Aug. 14, 2008  (CN) .......................... 2008 2 0207263

(51) Int. Cl.
*B60R 9/042*     (2006.01)
*B60R 9/00*      (2006.01)

(52) U.S. Cl. ........ 224/324; 224/310; 224/319; 224/325; 224/326

(58) Field of Classification Search ................. 224/324, 224/310, 319, 325, 326, 924; 414/462; 296/210
See application file for complete search history.

(56) References Cited

U.S. PATENT DOCUMENTS

| | | | | |
|---|---|---|---|---|
| 4,132,335 A * | 1/1979 | Ingram | .......................... | 224/324 |
| 4,239,138 A * | 12/1980 | Kowalski | ...................... | 224/321 |
| 4,442,961 A * | 4/1984 | Bott | .............................. | 224/570 |
| 4,452,384 A * | 6/1984 | Graber | ........................... | 224/314 |
| 4,524,893 A * | 6/1985 | Cole | .............................. | 224/319 |
| 4,616,771 A * | 10/1986 | Heideman | ...................... | 224/321 |
| 4,702,401 A * | 10/1987 | Graber et al. | ................. | 224/324 |
| 4,733,810 A * | 3/1988 | Graber et al. | ................. | 224/329 |
| 5,464,140 A * | 11/1995 | Hill | ................................ | 224/321 |
| 5,509,776 A * | 4/1996 | Specht et al. | ................. | 414/462 |
| 5,607,064 A * | 3/1997 | Fourel | ................................ | 211/5 |
| 5,709,521 A * | 1/1998 | Glass et al. | .................... | 414/462 |
| 5,820,002 A * | 10/1998 | Allen | ............................ | 224/324 |
| 6,149,039 A * | 11/2000 | Englander | ...................... | 224/310 |
| 6,460,743 B2 * | 10/2002 | Edgerly et al. | ................ | 224/324 |
| 6,561,398 B1 * | 5/2003 | Cole et al. | ...................... | 224/324 |
| 6,868,998 B2 * | 3/2005 | Dean | ............................ | 224/324 |
| 6,892,913 B1 * | 5/2005 | Andersson | ..................... | 224/319 |
| 7,481,344 B2 * | 1/2009 | Näslund et al. | ............... | 224/319 |
| 2002/0053581 A1* | 5/2002 | Peschmann et al. | .......... | 224/319 |
| 2002/0125279 A1* | 9/2002 | Edgerly et al. | ................ | 224/310 |
| 2003/0042281 A1* | 3/2003 | Ishikura | ........................ | 224/319 |

* cited by examiner

*Primary Examiner* — Nathan J Newhouse
*Assistant Examiner* — Lester L Vanterpool (57) ABSTRACT

A car top bicycle frame for retaining at least one bicycle transversally and obliquely comprises at least one positioning rod; a retaining buckle set; and a track set. By the positioning rod to combine to the track by the clamping sets, a bicycle can be installed upon a top of a car transversally and obliquely so as to be carried safely and conveniently. The bicycle can be fixed to the bicycle retaining frame on the ground before lifted to the car top. Then the bicycle and the frame are lifted to the entrance of the assisting guide track to enter into the track. The height for operation is reduced greatly so that no platform is needed. Only one people can lift the bicycle to the car top or descend the bicycle from the car top. More bicycles can be installed to the car top. The number of bicycles can be increased as the top of the car is prolonged.

5 Claims, 17 Drawing Sheets

CAR TOP BICYCLE FRAME FOR RETAINING AT LEAST ONE BICYCLE TRANSVERSALLY AND OBLIQUELY

FIELD OF THE INVENTION

The present invention related to bicycles, in particular to a car top bicycle frame for retaining at least one bicycle transversally and obliquely, wherein the bicycles can be arranged on the car top in parallel and transversally so that more bicycle can be arranged thereon. Only one user is needed for performing the operation of installing the bicycles to the car top.

BACKGROUND OF THE INVENTION

The bicycle frame installed at a top of a car has two basic types. One is an integral car top carries and another is a detached front wheel carrier. Both are fixed on a car top in advance. In using, the user must lift the bicycle to the car top for installation and then the bicycle is tightened. However it is often that it is too high to be achieved by users so that a platform is used.

However these prior arts have the following defects. The bicycle is longitudinally arranged (parallel to the moving direction of the car) and is stand on the car top. The supporting rod for bicycle body is tilt with a small angle and the weight center of the bicycle is high so that the user will worry about the safety in driving. Furthermore, the arrangement of the bicycle is confined by the width of the top side of the car.

Moreover, the detached front wheel car top carrier has the defect that the front wheel must be detached, but this is inconvenient. Moreover, the front wheel occupies a space of the interior of the car.

Therefore, there is a demand for a novel design which can improve above mentioned defects.

SUMMARY OF THE INVENTION

The object of the present invention is to provide a car top bicycle frame for retaining at least one bicycle transversally and obliquely, comprising: at least one positioning rod; each of two ends of the positioning rod being installed with a wheel retaining frame; one end of the wheel retaining frame being installed with a tightening belt; each of two ends of the positioning rod and a middle section of the positioning rod having a respective clamping set; and near a center portion of the positioning rod having a supporting rod; a retaining buckle set including a retaining buckle, a retaining buckle seat, and a retaining buckle ring; the retaining buckle ring being retained to the positioning rod and the retaining buckle ring resisting against a lateral side of the clamping set; the retaining buckle seat being combined to a lateral trench of a track; the retaining buckle seat being installed with the retaining buckle; the retaining buckle tightly retaining the retaining buckle ring so that the positioning rod being firmly secured to the track; a track set including at least one track; a lower side thereof being locked to a transversal rod at a top side of a car so as to retain the transversal rod to a top side of the car and the track set being longitudinally installed to a top of the car; and each track being installed with an assisting guide track for guiding the clamping sets of the positioning rod into the track; wherein by the positioning rod to combine to the track by the clamping sets, a bicycle can be installed upon a top of a car transversally and obliquely so as to be carried safely and conveniently.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

The present invention relates to a transversal tilt bicycle carrier at a car top, which comprises the following elements.

Figure 1:
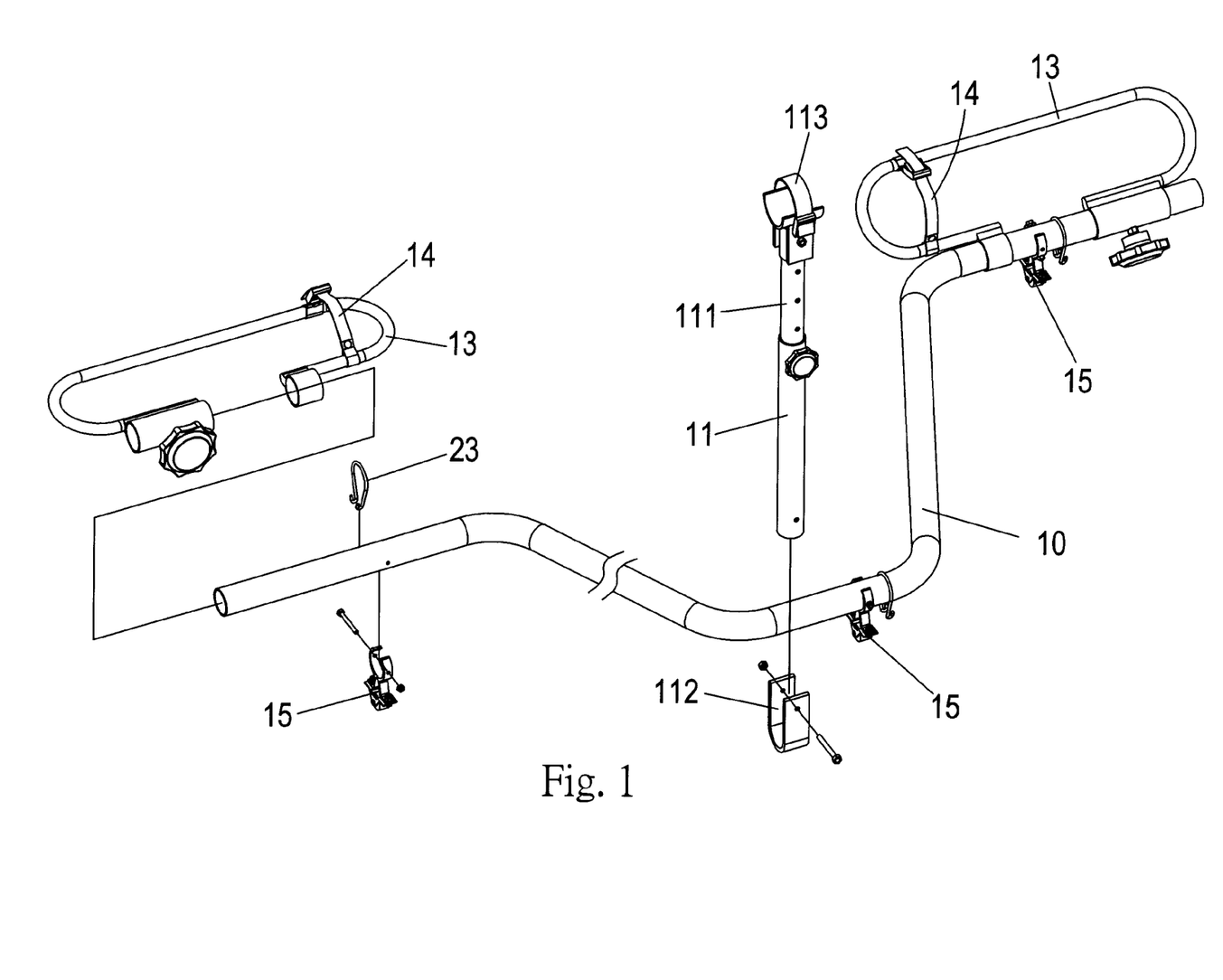
FIG. 1 is an exploded schematic view of the positioning rod of the present invention.
Figure 2:
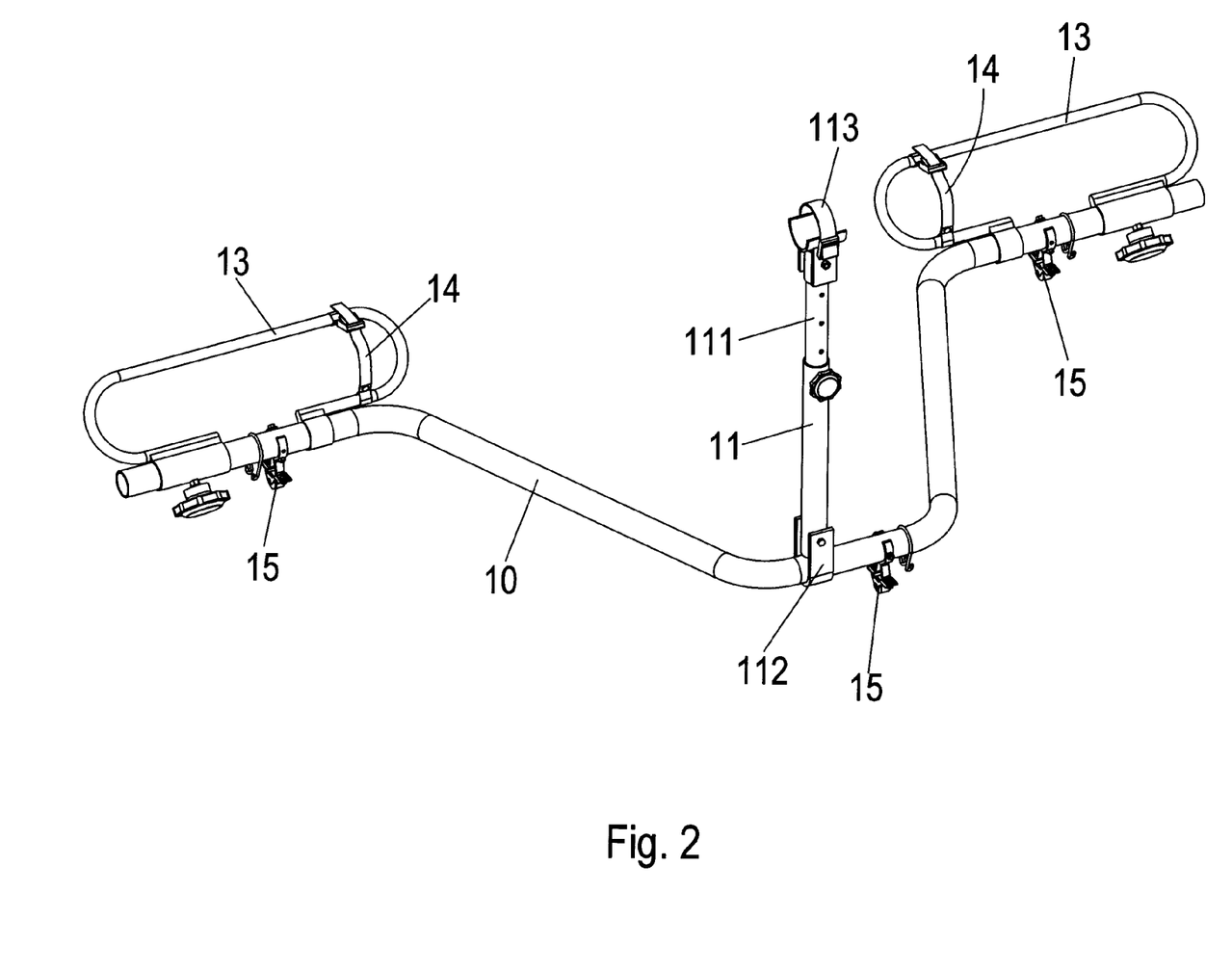
FIG. 2 is a perspective schematic view of the positioning rod of the present invention.
Figure 3:
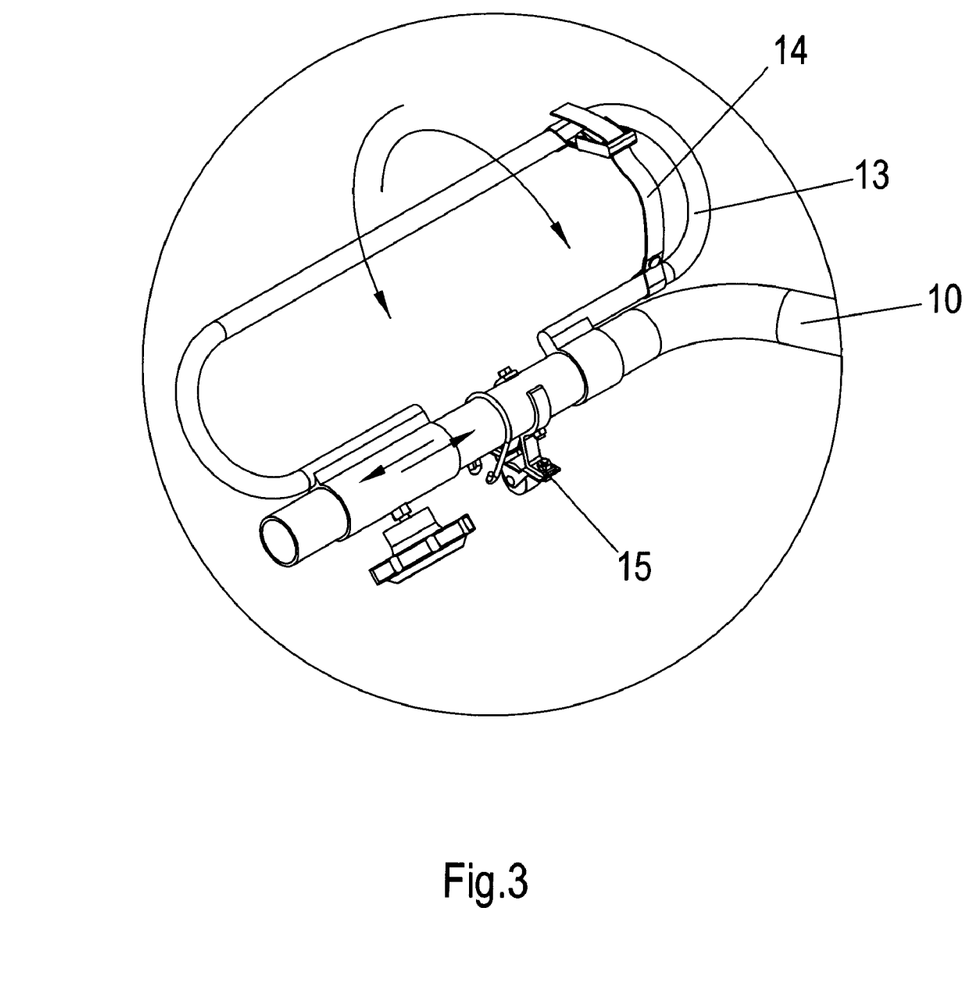
FIG. 3 is a schematic view showing the operation of the wheel retaining frame of the present invention.
Figure 4:
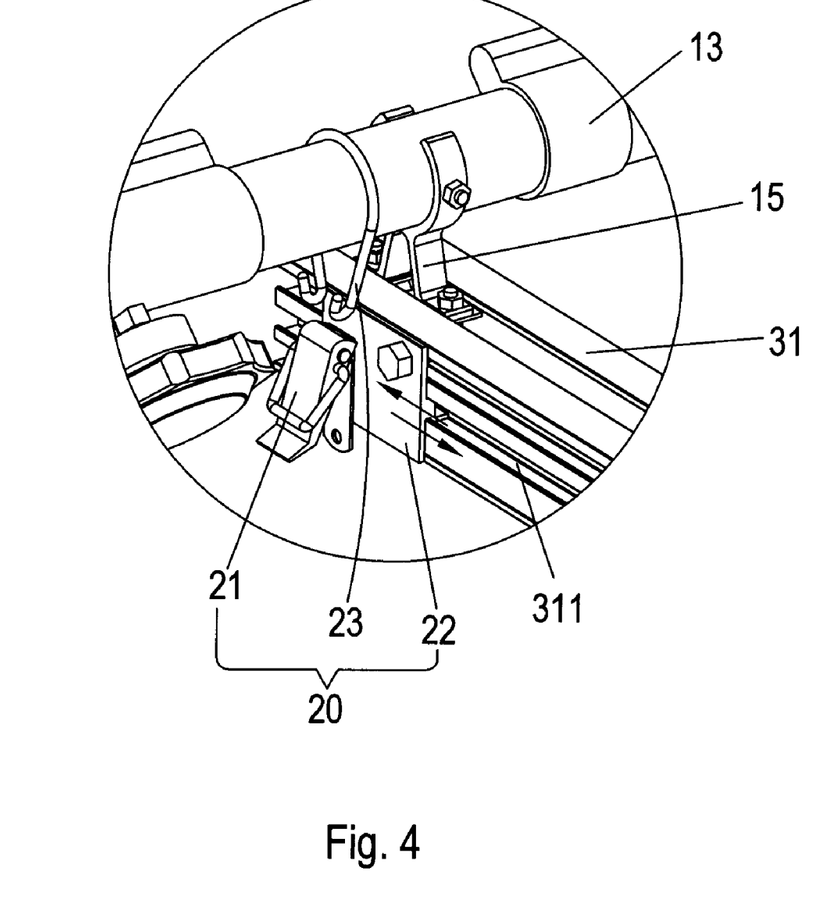
FIG. 4 is a partial enlarged schematic view showing the assembly that the positioning rod is combined with the retaining buckle according to the present invention.
Figure 5:
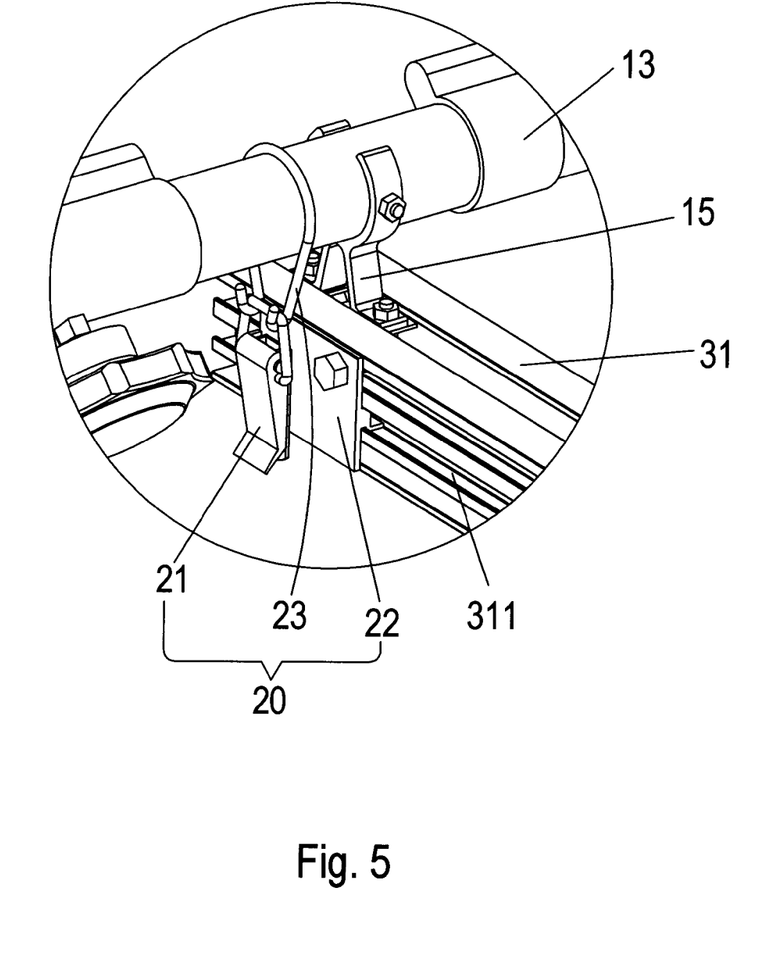
FIG. 5 is another partial enlarged schematic view showing the assembly of the positioning rod combined with the retaining buckle set according to the present invention.
Figure 6:
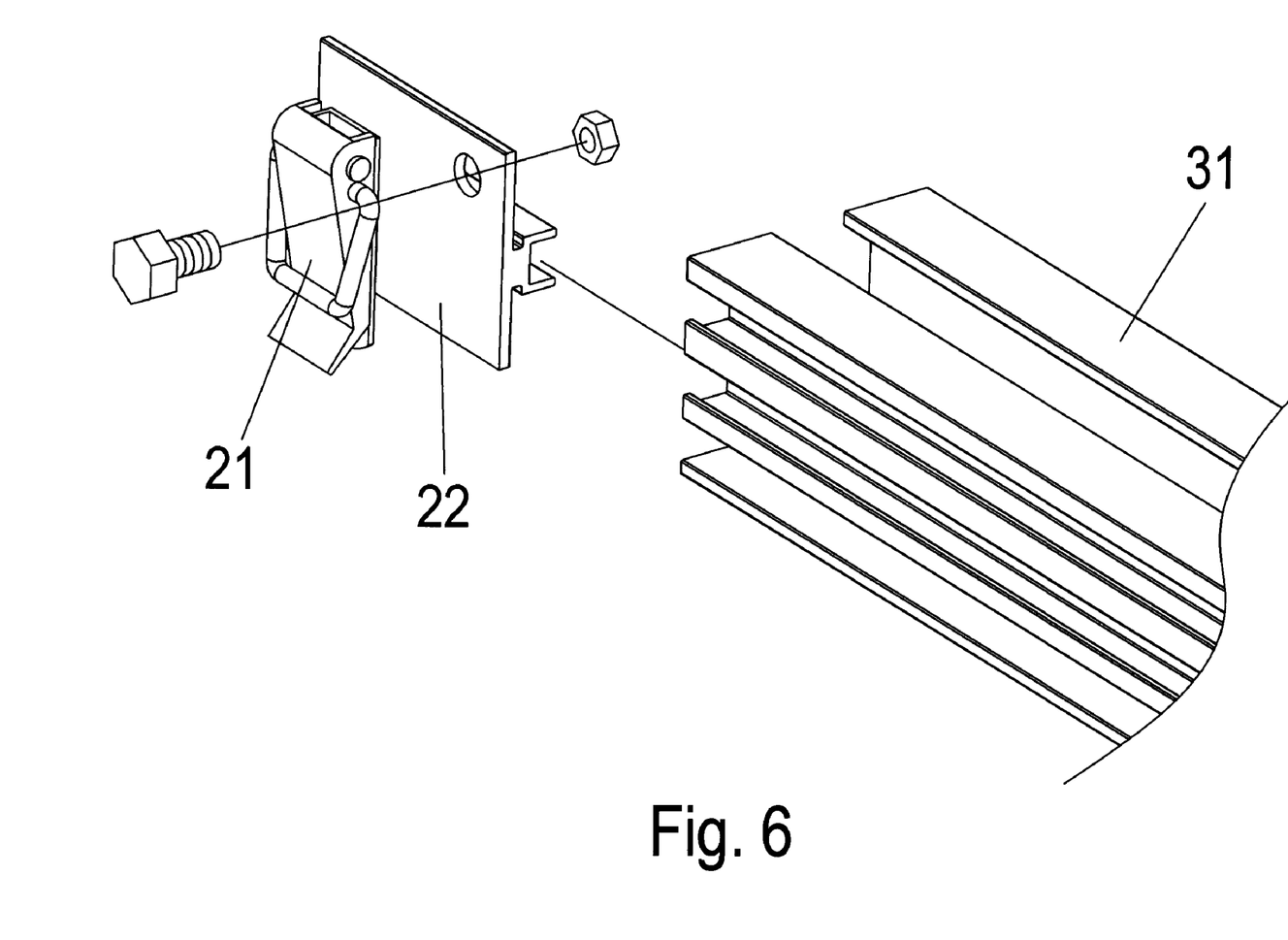
FIG. 6 is an exploded schematic view about the retaining buckle set and the track according to the present invention.
Figure 7:
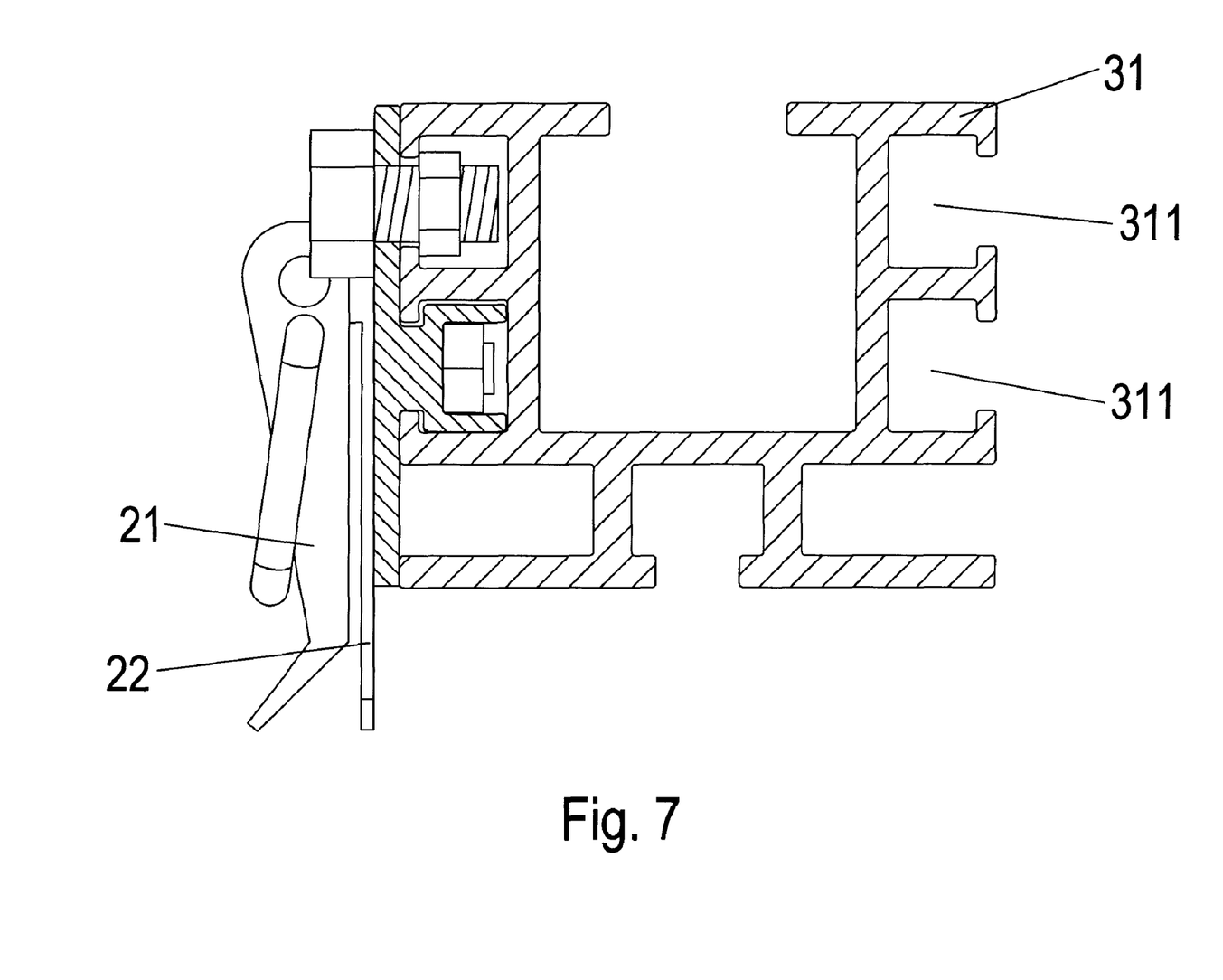
FIG. 7 is a cross sectional view showing that the retaining buckle set is combined with the track according to the present invention.

At least one positioning rod 10 (as illustrated in FIGS. 1 to 3) is included. Each of two ends of the positioning rod 10 is installed with a wheel retaining frame 13. One end of the wheel retaining frame 13 is installed with a tightening belt 14. Furthermore, each of two ends of the positioning rod 10 and a middle section of the positioning rod 10 has a respective clamping set 15. Near a center portion of the positioning rod 10 has a supporting rod 11. The supporting rod 11 includes a telescopic rod 111, a buckling belt 113, and a retaining seat 112. The telescopic rod 111 serves to adjust a length of the supporting rod 11 so as to adjust a tilt angle of the bicycle. One end of the supporting rod 11 is installed with the retaining seat 112. The supporting rod 11 is fixed to the positioning rod 10 with the angle therebetween is adjustable.

With reference to FIGS. 4 to 7, a retaining buckle set 20 includes a retaining buckle 21, a retaining buckle seat 22, and a retaining buckle ring 23. The retaining buckle ring 23 is retained to the positioning rod 10 and the retaining buckle ring 23 resists against a lateral side of the clamping set 15. The retaining buckle seat 22 is combined to a lateral trench 311 of a track 31. The retaining buckle seat 22 is installed with the retaining buckle 21. The retaining buckle 21 tightly retains the retaining buckle ring 23 so that the positioning rod 10 is firmly secured to the track 31.

A track set 30 includes at least one track 31. A lower side thereof is locked to a transversal rod 33 at a top side of a car so as to retain the present invention to a top side of the car and the track set 31 is longitudinally installed to a top of the car.

Figure 8:
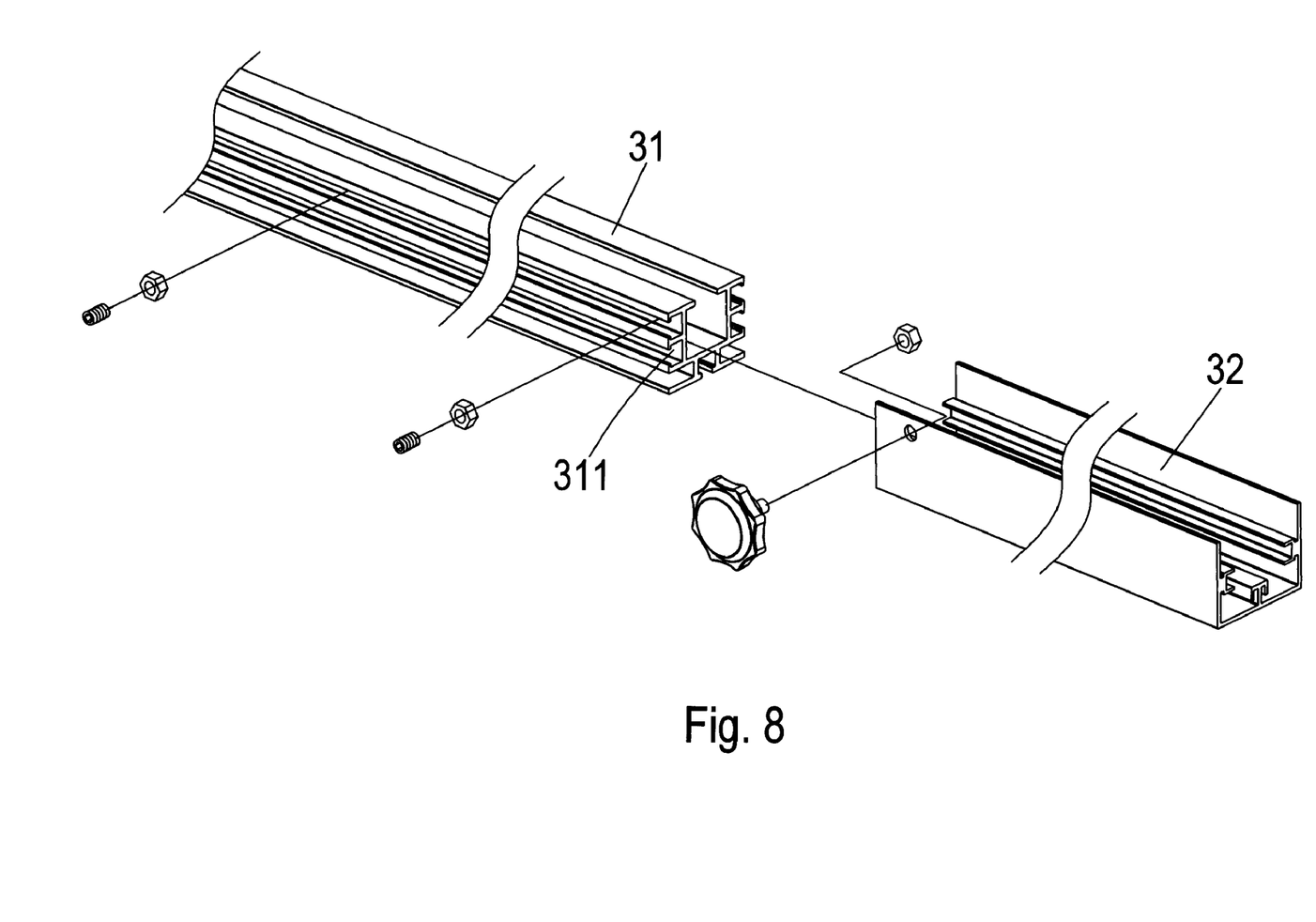
FIG. 8 is a perspective schematic view about the track and assisting guide track of the present invention.
Figure 9:
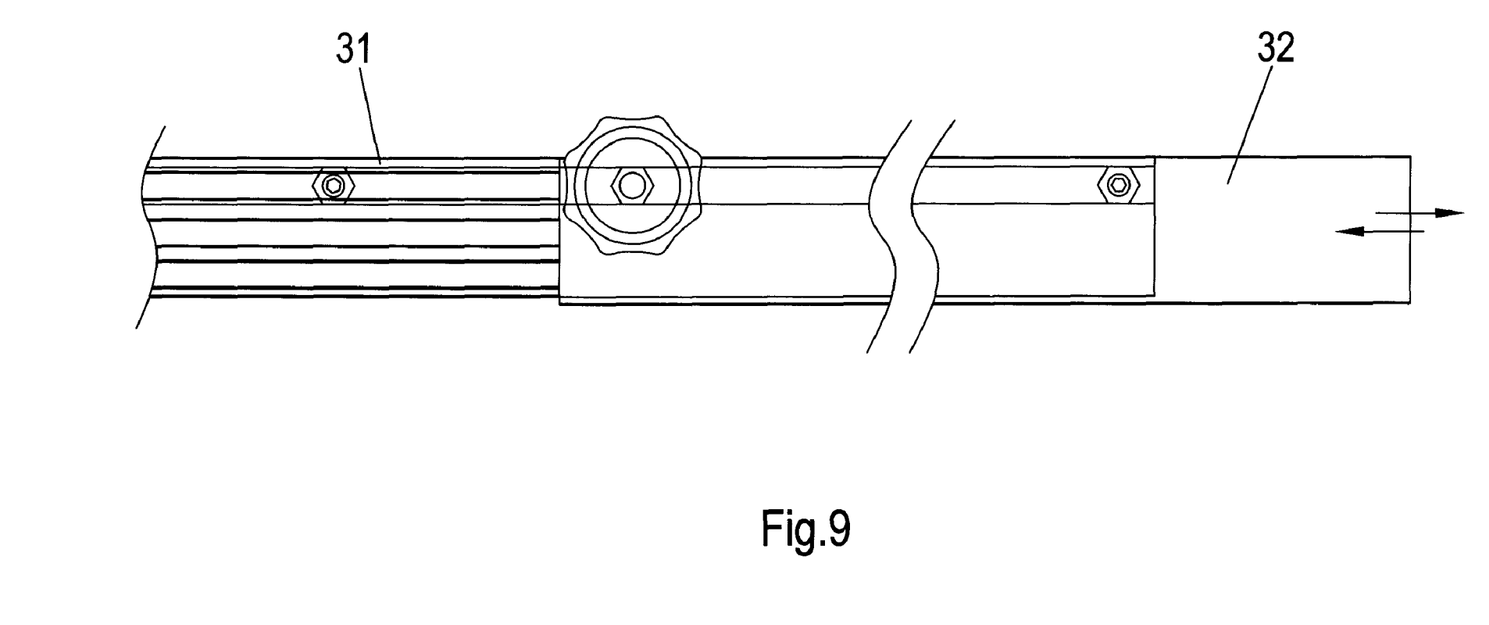
FIG. 9 is a schematic view showing the operation of the assisting guide track of the present invention.

Referring to FIGS. 8 and 9, the track 31 of the track set 30 is installed with an assisting guide track 32 for guiding the clamping set of the positioning rod 10 into the track 31. The assisting guide track 32 can be reduced into the track 31 for fixedness.

Figure 10:
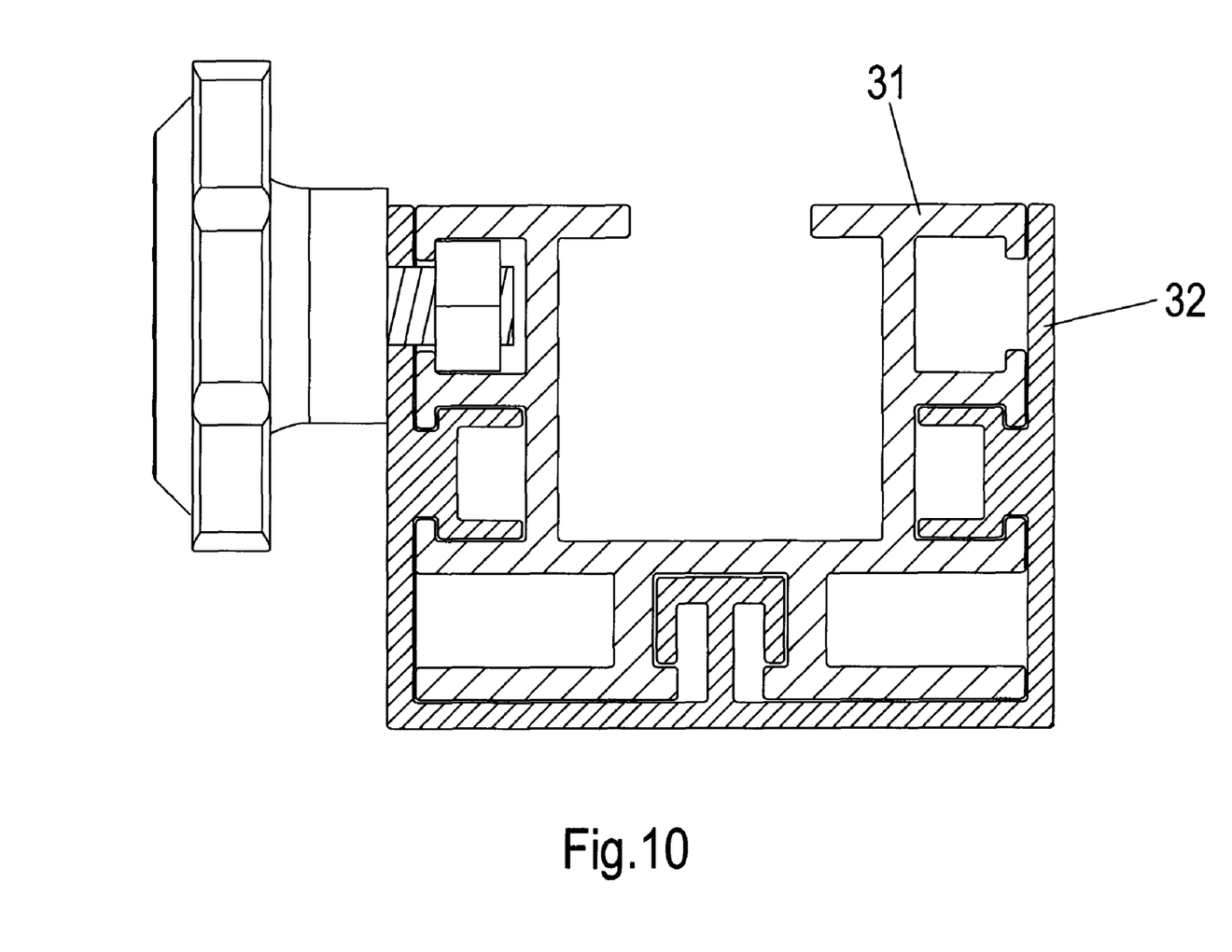
FIG. 10 is a schematic cross sectional view showing that the assisting guide track is combined with the track according to the present invention.

Referring to FIG. 10, a cross sectional view showing the combination of the track and the assisting guide track according to the present invention is illustrated.

Figure 11:
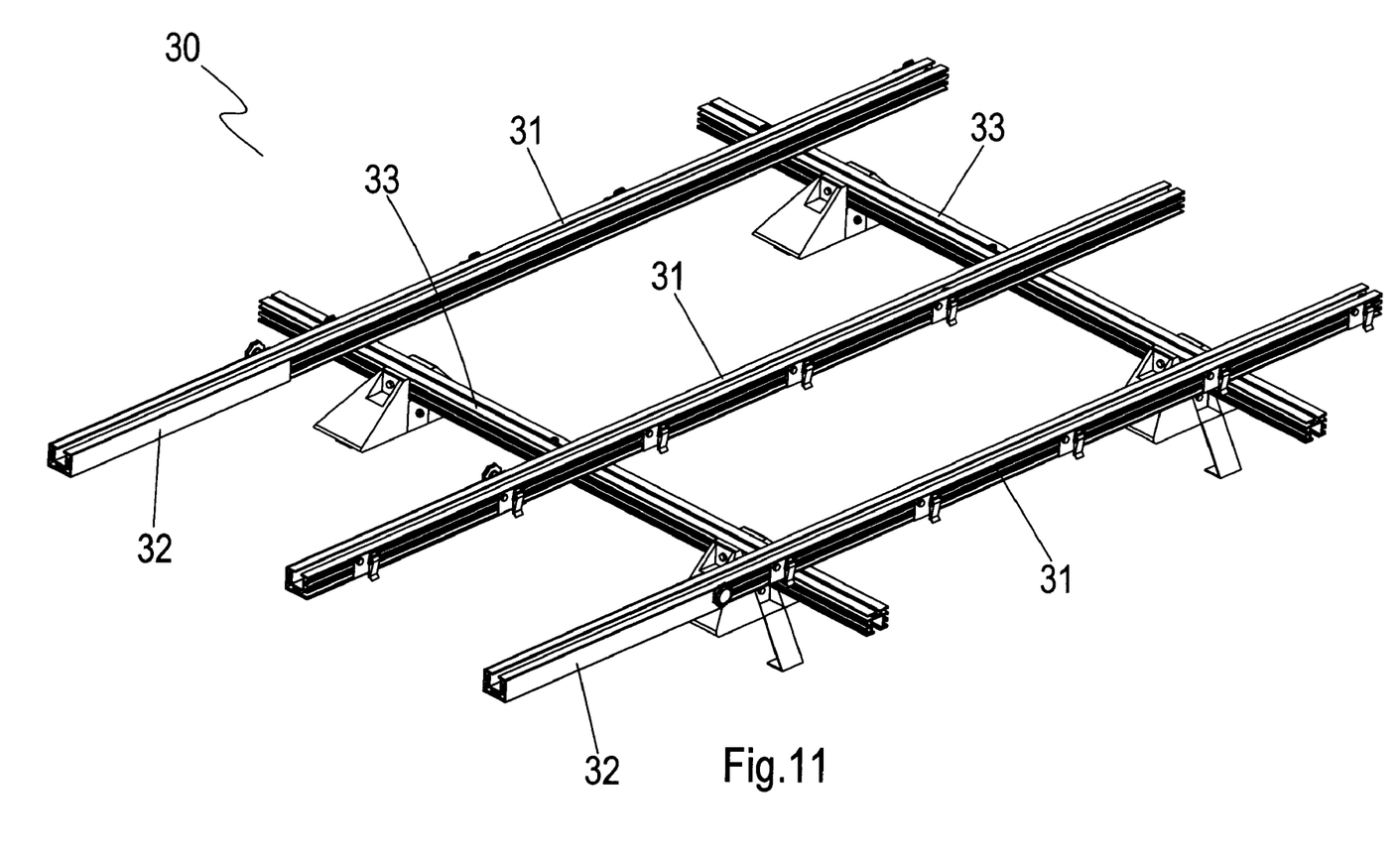
FIG. 11 is an assembled schematic view of the track set of the present invention.

FIG. 11 is an assembled schematic view about the combination of the track set. The track set is formed by at least one track 31. A lower side is locked to a car top transversal rod 33. A rear end of each track 31 is combined with one assisting guide track 32.

Figure 12:
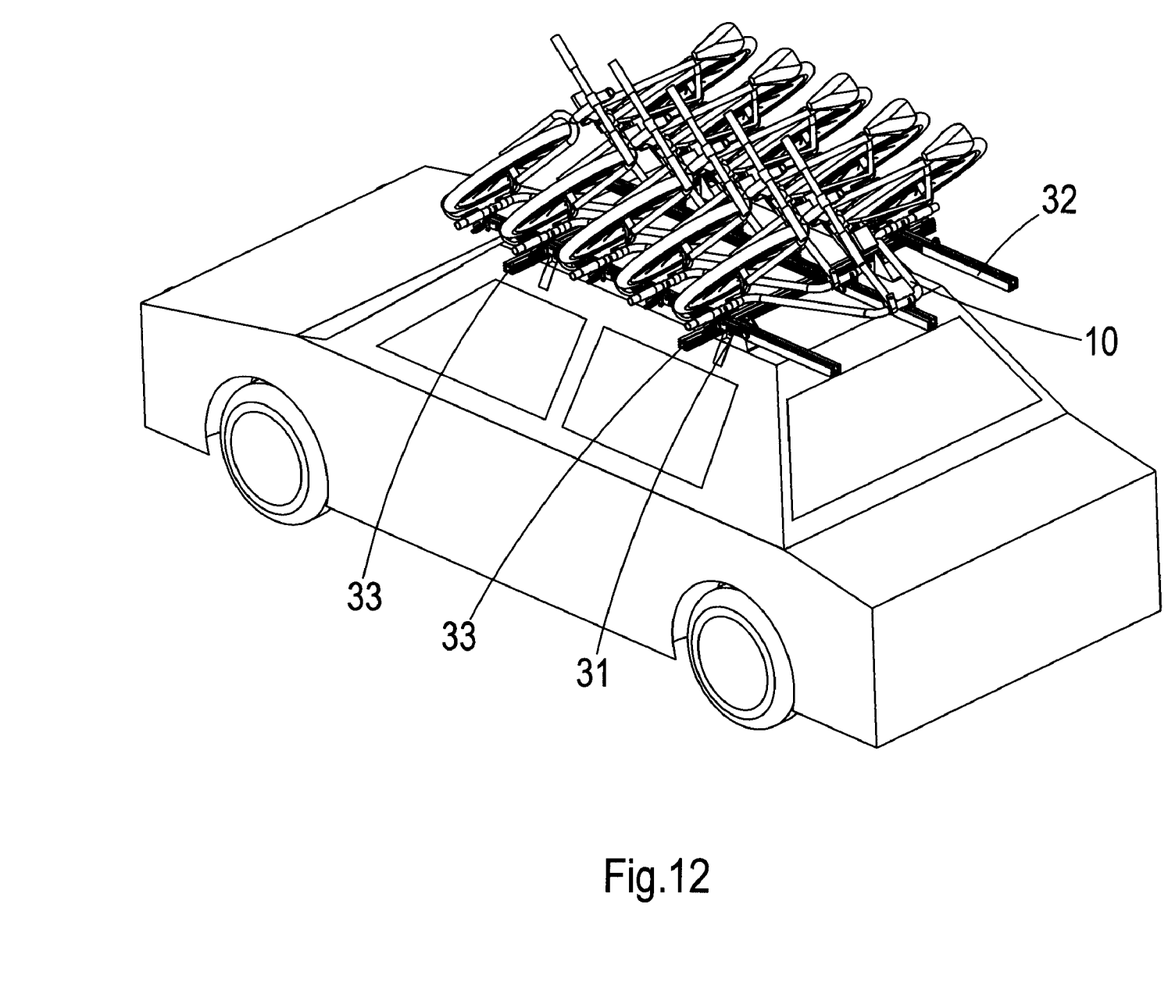
FIG. 12 shows one embodiment of the present invention.

Referring to FIG. 12, one embodiment of the present invention is illustrated. The positioning rod 10 is combined to the track 31 by using a clamping set so that bicycles can be obliquely and transversally arranged on the top of a car. Thereby, a plurality of bicycles can be carried safely.

In the present invention, when the positioning rod 10 is placed upon the car top, the assisting guide track 32 can be drawn out from the track 31. When the positioning rod 10 is placed upon the car top, then the assisting guide track 32 can be reduced into the track 31 to achieve the objects of safety carrying and convenience.

Figure 13:
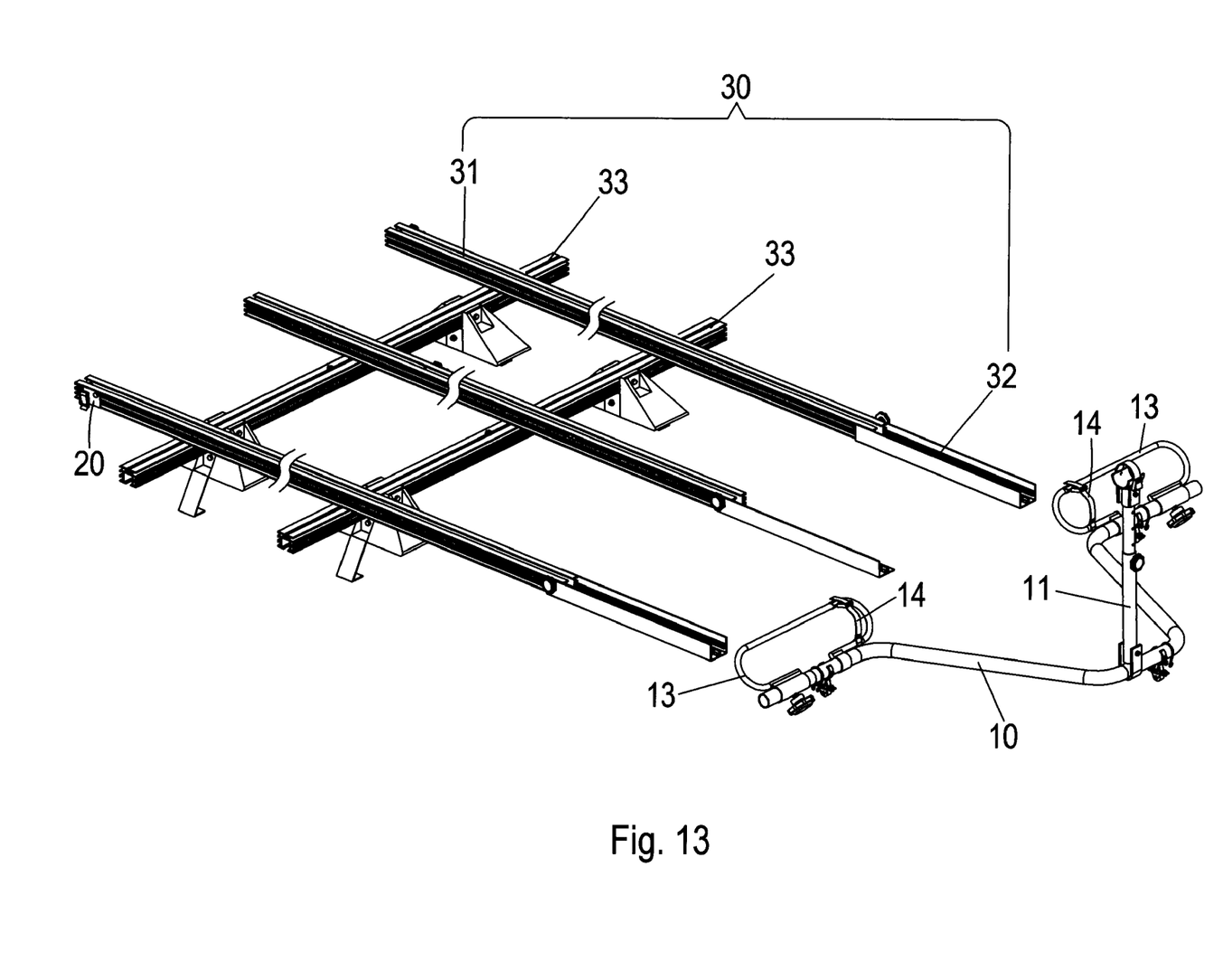
FIG. 13 shows the whole structure of the present invention.

Referring to FIG. 13, the whole structure of the present invention is illustrated. It is illustrated that the present invention includes a positioning rod 10, a buckle set 20, and a clamping set 30.

Figure 14:
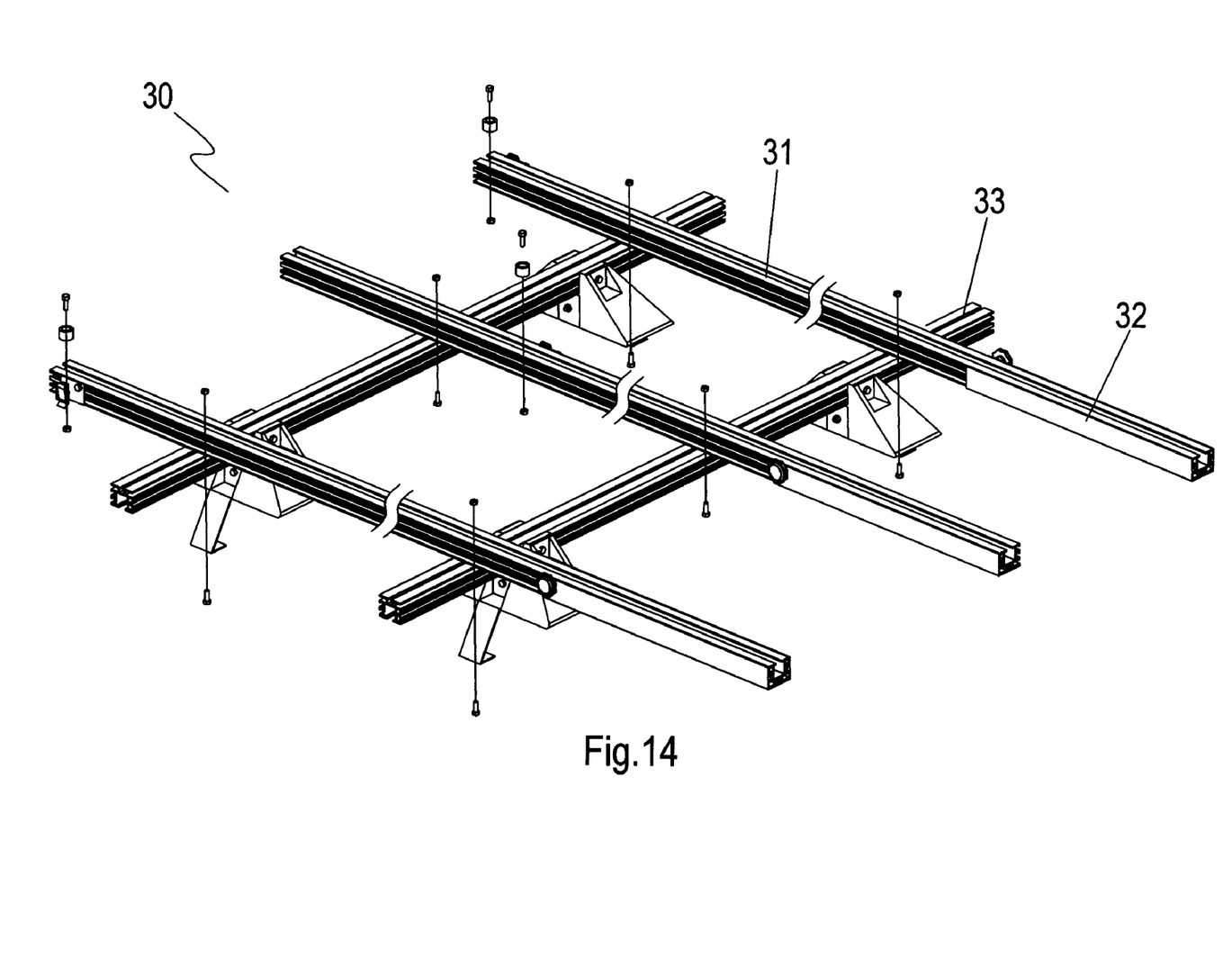
FIG. 14 is a perspective view showing the fixedness of the assisting guide track according to the present invention.

Referring to FIG. 14, a perspective view showing that the assisting guide track is reduced into the track 31 according to the present invention is illustrated.

Figure 15:
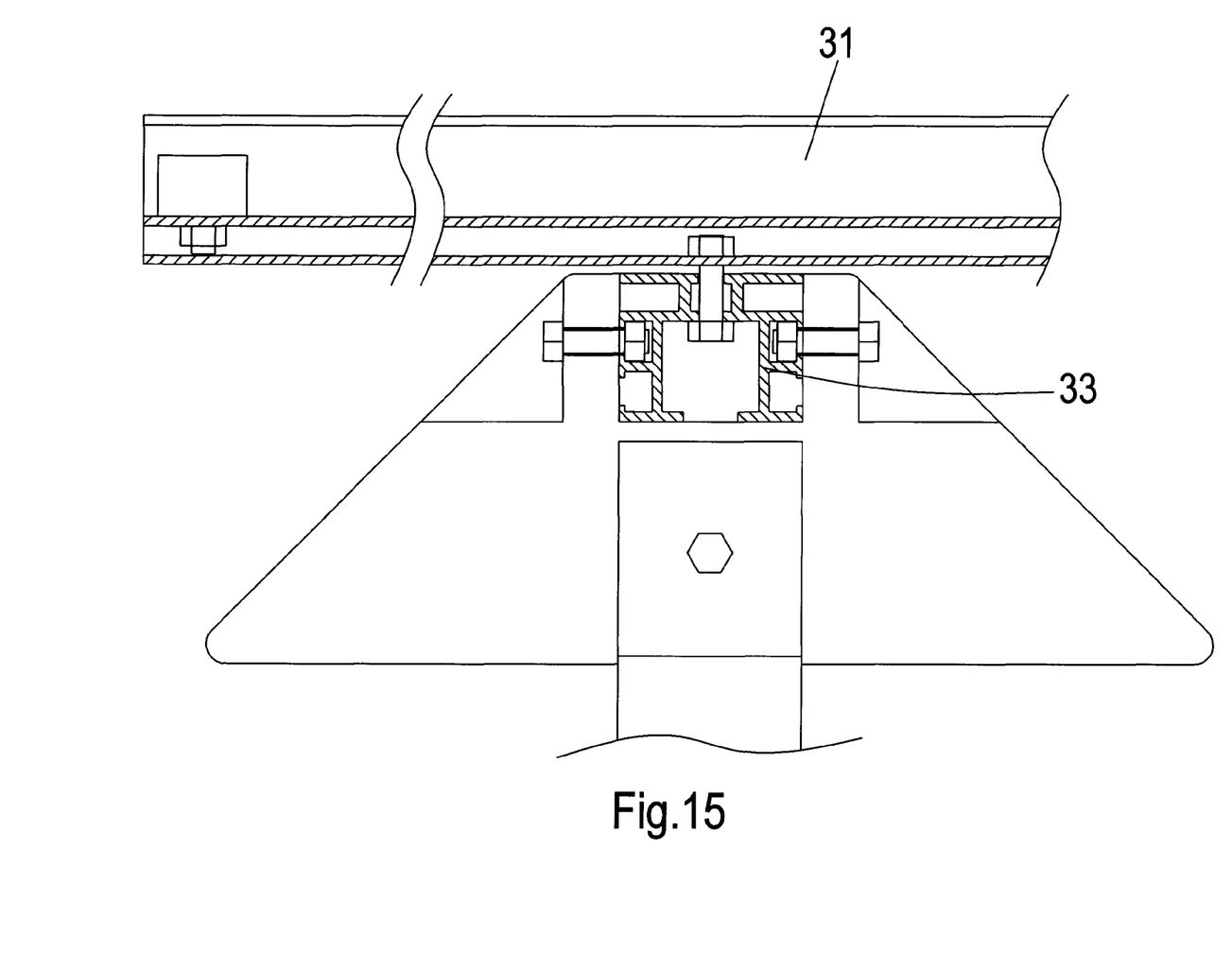
FIG. 15 is a schematic cross sectional view showing the fixedness of the car top transversal rod.

Referring to FIG. 15, a schematic cross sectional view is illustrated, where the car top transversal rods are fixed.

Figure 16:
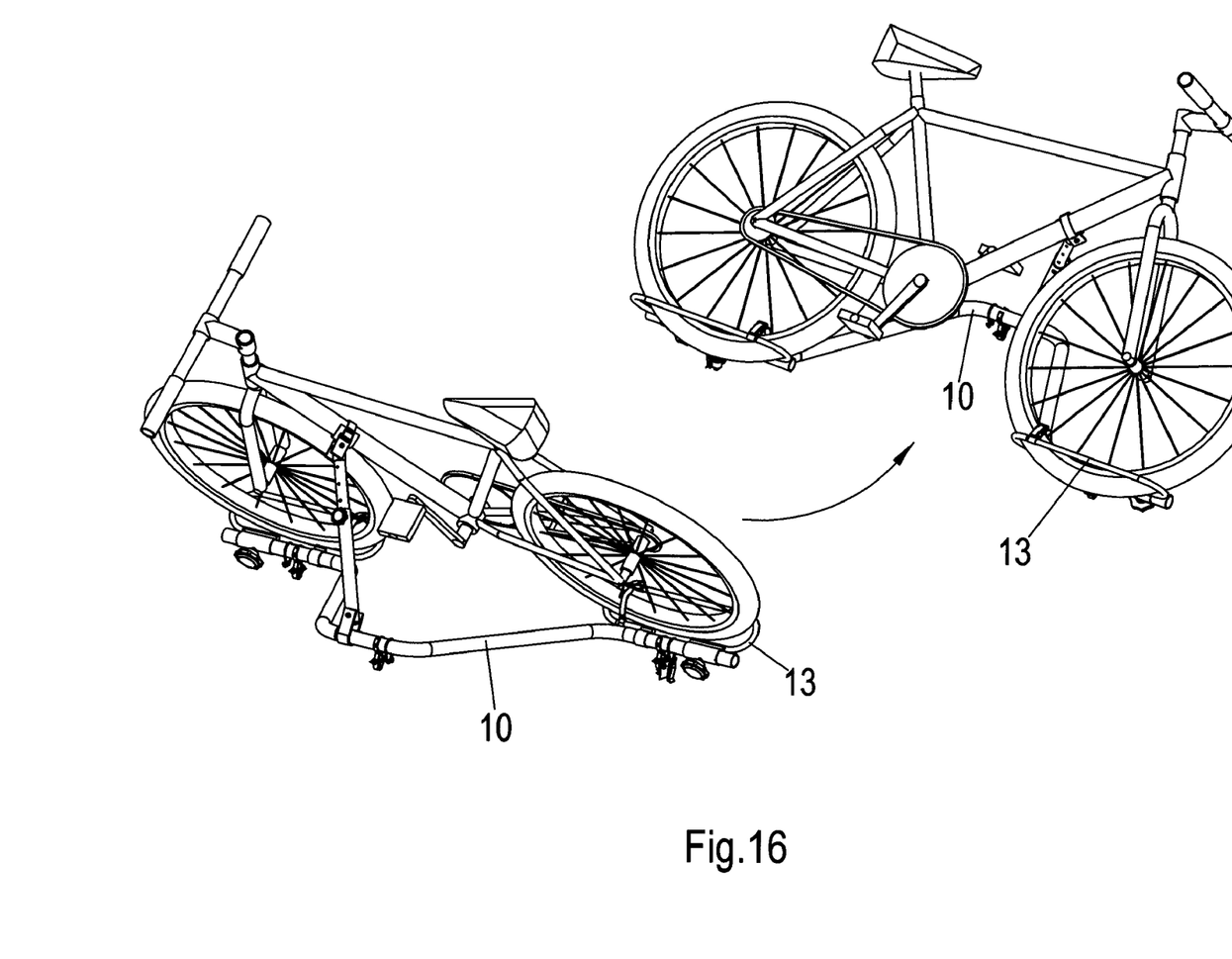
FIG. 16 is a schematic view showing that the positioning rod is used to fix a bicycle according to the present invention.
Figure 17:
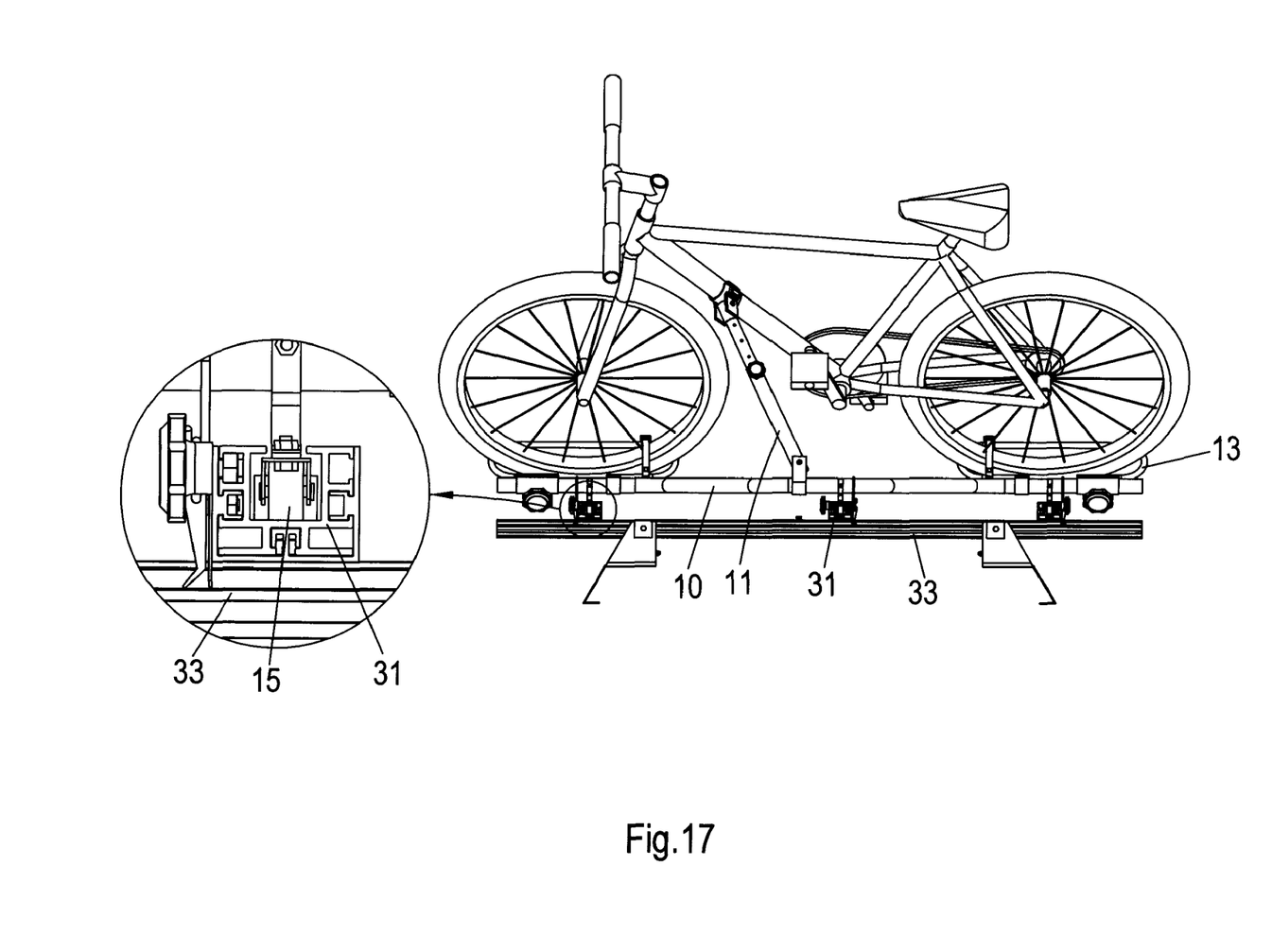
FIG. 17 is another schematic view showing that the positioning rod is used to fix a bicycle according to the present invention.

With reference to FIGS. 16 and 17, it is illustrated that the positioning rod of the present invention is used to position a bicycle. There are many forms for combing the positioning rod 10 to the track 31, for example, by using clamping sets, dovetailed grooves, embedding structure, etc.

Moreover, the positioning rod 10 has a V shape so that the gap between the positioning rods 10 is reduced to increase the number of bicycle to be carried. The cross section of each positioning rod 10 may have a round shape, a rectangular shape, a special extruding form, a hollow structure or a solid structure.

Advantages of the present invention will be described herein.

1. By the present invention, the bicycle can be fixed to the bicycle retaining frame on the ground before lifted to the car top. Then the bicycle and the frame are lifted to the entrance of the assisting guide track to enter into the track. The height for operation is reduced greatly so that no platform is needed. Only one people can lift the bicycle to the car top or descend the bicycle from the car top.

2. In the present invention, the bicycle is arranged on the car top inclined with respect to the car top. The gravitation center of the bicycle is descent so that the bicycle can be fixed tightly and thus the safety in driving is enhanced. The whole height is reduced. Thus more kinds of bicycles can be used with the present invention.

2. More bicycles can be installed to the car top. The number of bicycles can be increased as the top of the car is prolonged.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A car top bicycle frame for retaining at least one bicycle transversally and obliquely, comprising:
   at least one positioning rod; each of two ends of the positioning rod being installed with a wheel retaining frame; one end of the wheel retaining frame being installed with a tightening belt; each of two ends of the positioning rod and a middle section of the positioning rod having a respective clamping set; and near a center portion of the positioning rod having a supporting rod;
   a retaining buckle set including a retaining buckle, a retaining buckle seat, and a retaining buckle ring; the retaining buckle ring being retained to the positioning rod and the retaining buckle ring resisting against a lateral side of the clamping set; the retaining buckle seat being installed with the retaining buckle;
   a track set including at least one track; a lower side thereof being locked to a transversal rod at a top side of a car so as to retain the transversal rod to a top side of the car and the track set being longitudinally installed to a top of the car; and each track being installed with an assisting guide track for guiding the clamping sets of the positioning rod into the track;
   the retaining buckle seat being combined to a lateral trench of one of the at least one track; the retaining buckle tightly retaining the retaining buckle ring so that the positioning rod being firmly secured to the track; and
   wherein by the positioning rod to combine to the track by the clamping sets, a bicycle can be installed upon a top of a car transversally and obliquely so as to be carried safely and conveniently.

2. The car top bicycle frame for retaining at least one bicycle transversally and obliquely as claimed in claim 1, wherein the supporting rod includes a telescopic rod, a buckling belt, and a retaining seat; the telescopic rod serves to adjust a length of the supporting rod so as to adjust a tilt angle of the bicycle.

3. The car top bicycle frame for retaining at least one bicycle transversally and obliquely as claimed in claim 2, wherein one end of the supporting rod is installed with the retaining seat; the supporting rod is fixed to the positioning rod with the angle therebetween being adjustable.

4. The car top bicycle frame for retaining at least one bicycle transversally and obliquely as claimed in claim 1, wherein the positioning rod is combined to the track by using one of clamping sets, dovetailed grooves, and embedding structures.

5. The car top bicycle frame for retaining at least one bicycle transversally and obliquely as claimed in claim 1, wherein the positioning rod has a V shape so that the gap between the positioning rods is reduced to increase the number of bicycle to be carried; the cross section of each positioning rod has one of a round shape, a rectangular shape, a hollow structure and a solid structure.

* * * * *